United States Patent
Ori

(10) Patent No.: US 9,800,661 B2
(45) Date of Patent: Oct. 24, 2017

(54) DISTRIBUTED STORAGE OVER SHARED MULTI-QUEUED STORAGE DEVICE

(71) Applicant: E8 STORAGE SYSTEMS LTD., Ramat Gan (IL)

(72) Inventor: Zivan Ori, Tel Aviv (IL)

(73) Assignee: E8 STORAGE SYSTEMS LTD., Ramat Gan (IL)

( * ) Notice: Subject to any disclaimer, the term of this patent is extended or adjusted under 35 U.S.C. 154(b) by 282 days.

(21) Appl. No.: 14/797,272

(22) Filed: Jul. 13, 2015

(65) Prior Publication Data

US 2016/0057224 A1 Feb. 25, 2016

Related U.S. Application Data

(63) Continuation of application No. 14/599,510, filed on Jan. 18, 2015, now Pat. No. 9,112,890.

(60) Provisional application No. 62/039,520, filed on Aug. 20, 2014.

(51) Int. Cl.
G06F 15/173 (2006.01)
H04L 29/08 (2006.01)
G06F 3/06 (2006.01)

(52) U.S. Cl.
CPC ............ H04L 67/1097 (2013.01); G06F 3/06 (2013.01); H04L 67/2842 (2013.01)

(58) Field of Classification Search
USPC .................. 709/202, 203, 223, 226, 245
See application file for complete search history.

(56) References Cited

U.S. PATENT DOCUMENTS

| | | | |
|---|---|---|---|
| 6,446,220 B1 | 9/2002 | Menon | |
| 6,584,517 B1 | 6/2003 | Raza | |
| 8,095,763 B2 | 1/2012 | Piszczek et al. | |
| 8,510,265 B1 | 8/2013 | Boone et al. | |
| 8,725,934 B2 | 5/2014 | Batwara et al. | |
| 8,812,450 B1 | 8/2014 | Kesavan et al. | |
| 8,897,315 B1 | 11/2014 | Arad et al. | |
| 9,164,689 B2 | 10/2015 | O'Brien | |
| 9,251,052 B2 | 2/2016 | Talagala et al. | |
| 2002/0103923 A1* | 8/2002 | Cherian ............... | G06F 3/0613 709/235 |
| 2003/0028725 A1 | 2/2003 | Naberhuis et al. | |
| 2003/0067942 A1 | 4/2003 | Altenbernd et al. | |
| 2004/0068558 A1 | 4/2004 | De Miguel | |
| 2004/0153576 A1 | 8/2004 | Hansmann et al. | |
| 2005/0050273 A1 | 3/2005 | Horn et al. | |
| 2006/0031450 A1 | 2/2006 | Unrau et al. | |

(Continued)

OTHER PUBLICATIONS

U.S. Appl. No. 14/697,653 Office Action dated Dec. 31, 2015.
(Continued)

*Primary Examiner* — Liangche A Wang
(74) *Attorney, Agent, or Firm* — D. Kligler IP Services Ltd.

(57) ABSTRACT

A method for data storage includes, in a system that includes one or more storage controllers, multiple servers and multiple multi-queue storage devices, assigning in each storage device server-specific queues for queuing data-path storage commands exchanged with the respective servers. At least some of the data-path storage commands are exchanged directly between the servers and the storage devices, not via the storage controllers, to be queued and executed in accordance with the corresponding server-specific queues.

15 Claims, 5 Drawing Sheets

(56) References Cited

U.S. PATENT DOCUMENTS

| | | | |
|---|---|---|---|
| 2007/0050591 A1* | 3/2007 | Boyd | G06F 9/461 |
| | | | 711/171 |
| 2007/0168396 A1 | 7/2007 | Adams et al. | |
| 2010/0153617 A1* | 6/2010 | Miroshnichenko | G06F 3/061 |
| | | | 711/6 |
| 2010/0250831 A1 | 9/2010 | O'Brien et al. | |
| 2011/0060887 A1 | 3/2011 | Thatcher et al. | |
| 2011/0246720 A1 | 10/2011 | Nakamura et al. | |
| 2011/0296133 A1 | 12/2011 | Flynn et al. | |
| 2012/0079318 A1 | 3/2012 | Colgrove et al. | |
| 2012/0144110 A1 | 6/2012 | Smith | |
| 2012/0233396 A1 | 9/2012 | Flynn et al. | |
| 2013/0031234 A1* | 1/2013 | Alfano | H04L 41/0206 |
| | | | 709/223 |
| 2013/0046949 A1 | 2/2013 | Colgrove et al. | |
| 2013/0138836 A1 | 5/2013 | Cohen et al. | |
| 2013/0179649 A1 | 7/2013 | Green et al. | |
| 2013/0198312 A1 | 8/2013 | Tamir et al. | |
| 2013/0275447 A1 | 10/2013 | Ben-Tsion et al. | |
| 2014/0040411 A1 | 2/2014 | Weber et al. | |
| 2014/0189032 A1 | 7/2014 | Sugimoto et al. | |
| 2014/0195849 A1* | 7/2014 | Parladori | G06F 11/3006 |
| | | | 714/15 |
| 2014/0289462 A9 | 9/2014 | Malwankar | |
| 2015/0012699 A1 | 1/2015 | Rizzo et al. | |
| 2015/0127923 A1 | 5/2015 | Miller et al. | |
| 2015/0212752 A1 | 7/2015 | Nemazie et al. | |
| 2016/0004642 A1 | 1/2016 | Sugimoto et al. | |
| 2016/0034418 A1 | 2/2016 | Romem et al. | |
| 2016/0162209 A1 | 6/2016 | Calderone | |

OTHER PUBLICATIONS

International Application # PCT/IB2015/058842 Search Report dated Feb. 28, 2016.
International Application # PCT/IB2016/051958 Search Report dated Aug. 2, 2016.
U.S. Appl. No. 15/015,157 Office Action dated Jun. 8, 2016.
U.S. Appl. No. 14/997,600 Office Action dated Jun. 17, 2016.
U.S. Appl. No. 14/697,653 Office Action dated May 3, 2016.
U.S. Appl. No. 15/086,102 Office Action dated Jul. 28, 2016.
Ori., U.S. Appl. No. 14/794,868, filed Jul. 9, 2015.
U.S. Appl. No. 14/697,653 Office Action dated Jul. 17, 2015.
Friedman et al., US Provisional Application filed Jun. 11, 2015.
Friedman, U.S. Appl. No. 14/697,653, filed Apr. 28, 2015.
Friedman, U.S. Appl. No. 62/146,984, filed Apr. 14, 2015.
U.S. Appl. No. 15/424,921 Office Action dated Jun. 9, 2017.
U.S. Appl. No. 15/492,000 Office Action dated Jul. 5, 2017.

* cited by examiner

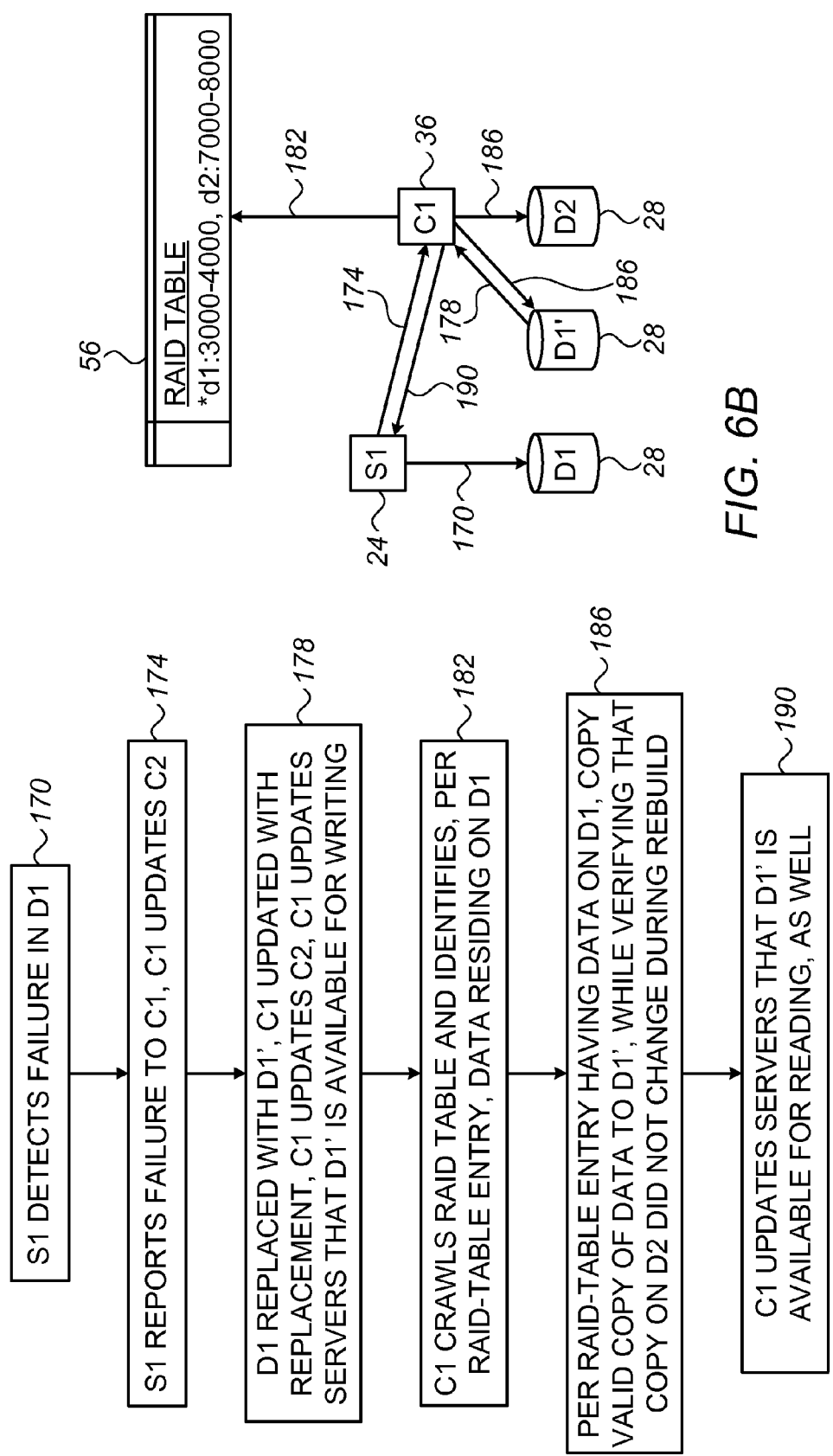

DISTRIBUTED STORAGE OVER SHARED MULTI-QUEUED STORAGE DEVICE

CROSS-REFERENCE TO RELATED APPLICATIONS

This application is a continuation of U.S. patent application Ser. No. 14/599,510, filed Jan. 18, 2015, which claims the benefit of U.S. Provisional Patent Application 62/039,520, filed Aug. 20, 2014. The disclosures of these related applications are incorporated herein by reference.

FIELD OF THE INVENTION

The present invention relates generally to data storage, and particularly to methods and systems for distributed storage.

BACKGROUND OF THE INVENTION

Various techniques for distributed data storage are known in the art. For example, PCT International Publication WO 2013/024485, whose disclosure is incorporated herein by reference, describes a method of managing a distributed storage space, including mapping a plurality of replica sets to a plurality of storage managing modules installed in a plurality of computing units. Each of the plurality of storage managing modules manages access of at least one storage consumer application to replica data of at least one replica of a replica set from the plurality of replica sets. The replica data is stored in at least one drive of a respective computing unit.

SUMMARY OF THE INVENTION

An embodiment of the present invention that is described herein provides a method for data storage including, in a system that includes one or more storage controllers, multiple servers and multiple multi-queue storage devices, assigning in each storage device server-specific queues for queuing data-path storage commands exchanged with the respective servers. At least some of the data-path storage commands are exchanged directly between the servers and the storage devices, not via the storage controllers, to be queued and executed in accordance with the corresponding server-specific queues.

In some embodiments, exchanging the data-path storage commands includes queuing the data-path storage commands in a given server in one or more storage-device-specific queues, which respectively correspond to one or more of the storage devices accessed by the given server. In some embodiments, exchanging the data-path storage commands includes running in a given server a respective storage agent that communicates directly with the server-specific queues assigned to the given server in the storage devices.

In some embodiments, exchanging the data-path storage commands includes translating in a given server between virtual and physical storage addresses, and specifying the data-path storage commands in the given server using the physical storage addresses. Translating between the virtual and the physical storage addresses may include locally storing in the given server a mapping that maps each virtual address range to multiple redundant ranges of the physical storage addresses located on two or more of the storage devices, and translating between the virtual and the physical storage addresses by querying the mapping.

In an embodiment, the method includes maintaining in the storage controllers a volume map that specifies user volumes for use by the servers, and exchanging the data-path storage commands includes accessing the storage devices by querying the volume map. In an example embodiment, the method includes locally caching at least a portion of the volume map in a given server, and exchanging the data-path storage commands includes accessing the storage devices by the given server by querying the locally-cached volume map.

In another embodiment, the method includes granting to a given server a reservation on at least a portion of a user volume only in response to ensuring that all other servers that are attached to the user volume have temporarily stopped accessing the user volume and have been provided with an up-to-date state of the reservation. In yet another embodiment, the method includes, in response to an access by a given server to a logical address that is not yet allocated a respective physical address, allocating the respective physical address by the storage controllers. In still another embodiment, the method includes, in response to replacement of a failed storage device, rebuilding on a new storage device data that was stored on the failed storage device, by copying redundant copies of the data from one or more other storage devices to the new storage device.

There is additionally provided, in accordance with an embodiment of the present invention, a computing system including one or more storage controllers and multiple storage agents. The storage controllers are configured to assign in each of multiple multi-queue storage devices server-specific queues for queuing data-path storage commands exchanged with multiple servers. The storage agents are configured to run on the respective servers and to exchange at least some of the data-path commands directly between the servers and the storage devices, not via the storage controllers, to be queued and executed in accordance with the corresponding server-specific queues.

There is further provided, in accordance with an embodiment of the present invention, a storage controller including a network interface and a processor. The network interface is configured for communicating over a communication network with multiple servers and with multiple multi-queue storage devices. The processor is configured to assign in each of the multi-queue storage devices server-specific queues for queuing data-path storage commands exchanged with the servers, so as to enable the servers to exchange at least some of the data-path commands directly with the storage devices, not via the storage controllers, to be queued and executed in accordance with the corresponding server-specific queues.

There is also provided, in accordance with an embodiment of the present invention, a server including a network interface and a processor. The network interface is configured for communicating over a communication network with multiple multi-queue storage devices and with one or more storage controllers. The processor is configured to exchange data-path commands directly with the storage devices, not via the storage controllers, to be queued and executed in server-specific queues assigned in the multi-queue storage devices.

The present invention will be more fully understood from the following detailed description of the embodiments thereof, taken together with the drawings in which:

BRIEF DESCRIPTION OF THE DRAWINGS

FIGS. 6A and 6B are diagrams that schematically illustrate a method for data rebuilding following storage device failure, in accordance with an embodiment of the present invention.

DETAILED DESCRIPTION OF EMBODIMENTS

Overview

Embodiments of the present invention that are described herein provide improved methods and systems for distributed data storage. The techniques described herein can be implemented in any suitable type of computer system that comprises multiple servers. In some embodiments, data storage is carried out using multiple storage agents that are installed on the servers, multiple storage devices for storing the data, and one or more storage controllers.

The disclosed system is designed such that the storage controllers are involved in relatively infrequent control-plane operations. Data-path storage commands, e.g., read and write commands, are exchanged directly between the storage agents in the servers and the storage devices, without involving or going through the storage controllers.

In other words, the disclosed techniques distribute the storage data-path functionality among the servers, instead of centralizing it in the storage controllers. Since the data path is distributed, there is no risk of the storage controllers becoming a bandwidth bottleneck. The resulting system configuration thus enables extremely high throughput and small latency, and is highly scalable.

In particular, the disclosed configuration enables the system to fully utilize the performance of high-bandwidth Solid State Drives (SSDs), such as multi-queued NVM-express (NVMe) SSDs. In an example embodiment, multiple server-specific queues are defined in each storage device, each queue dedicated to serve a respective server. By exploiting the internal queuing and scheduling capabilities of the storage devices, the system is relieved of the need to arbitrate or otherwise coordinate data-path storage operations between servers. The servers are typically stateless, with the exception of volatile metadata, and each server needs only be aware of its own storage commands. As such, failure or removal of a server has no impact on the rest of the system.

The disclosed system configuration is described in detail below. Several example mechanisms that are implemented on top of this configuration, such as write-command processing, user-volume reservation, memory space allocation and recovery from storage-device failure, are also described.

System Description

Figure 1:
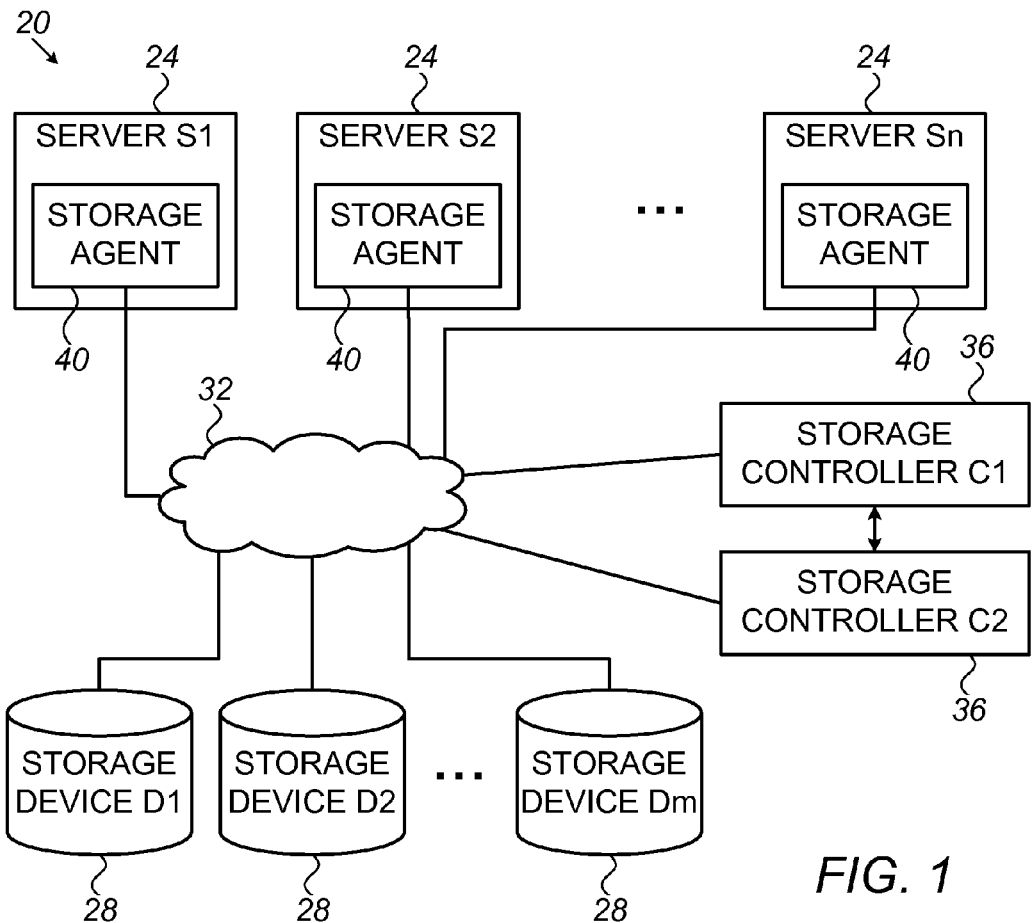
FIG. 1 is a block diagram that schematically illustrates a computing system that uses distributed data storage, in accordance with an embodiment of the present invention.

FIG. 1 is a block diagram that schematically illustrates a computing system 20, in accordance with an embodiment of the present invention. System 20 may comprise, for example, a data center, a High-Performance Computing (HPC) cluster, or any other suitable system. System 20 comprises multiple servers 24 denoted S1 . . . Sn, and multiple storage devices 28 denoted D1 . . . Dm. The servers and storage devices are interconnected by a communication network 32. The system further comprises one or more storage controllers 36 that manage the storage of data in storage devices 28.

Storage-related functions in each server 24 are carried out by a respective storage agent 40. Agents 40 typically comprise software modules installed and running on the respective servers. The functions of agents 40, and their interaction with storage devices 28 and storage controllers 36, are described in detail below.

Servers 24 may comprise any suitable computing platforms that run any suitable applications. In the present context, the term "server" includes both physical servers and virtual servers. For example, a virtual server may be implemented using a Virtual Machine (VM) that is hosted in some physical computer. Thus, in some embodiments multiple virtual servers may run in a single physical computer. Storage controllers 36, too, may be physical or virtual. In an example embodiment, the storage controllers may be implemented as software modules that run on one or more physical servers 24.

Storage devices 28 may comprise any suitable storage medium, such as, for example, Solid State Drives (SSD), Non-Volatile Random Access Memory (NVRAM) devices or Hard Disk Drives (HDDs). In an example embodiment, storage devices 28 comprise multi-queue SSDs that operate in accordance with the NVMe specification. Network 32 may operate in accordance with any suitable communication protocol, such as Ethernet or Infiniband. In some embodiments, some of the disclosed techniques can be implemented using Direct Memory Access (DMA) and/or Remote Direct Memory Access (RDMA) operations.

Generally, system 20 may comprise any suitable number of servers, storage devices and storage controllers. In the present example, the system comprises two storage controllers denoted C1 and C2, for resilience. One of the storage controllers is defined as primary, while the other controller serves as hot backup and can replace the primary storage controller in case of failure.

In the embodiments described herein, the assumption is that any server 24 is able to communicate with any storage device 28, but there is no need for the servers to communicate with one another. Storage controllers 36 are assumed to be able to communicate with all servers 24 and storage devices 28, as well as with one another.

The configuration of system 20 shown in FIG. 1 is an example configuration, which is chosen purely for the sake of conceptual clarity. In alternative embodiments, any other suitable system configuration can be used. The different system elements may be implemented using suitable hardware, using software, or using a combination of hardware and software elements.

Each server 24 typically comprises a suitable network interface for communicating over network 32, and a suitable processor that carries out the various server functions. Each storage controller 36 typically comprises a suitable network interface for communicating over network 32, and a suitable processor that carries out the various storage controller functions. In some embodiments, servers 24 and/or storage controllers 36 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Main Data Structures and Storage-Agent Configuration

Figure 2:
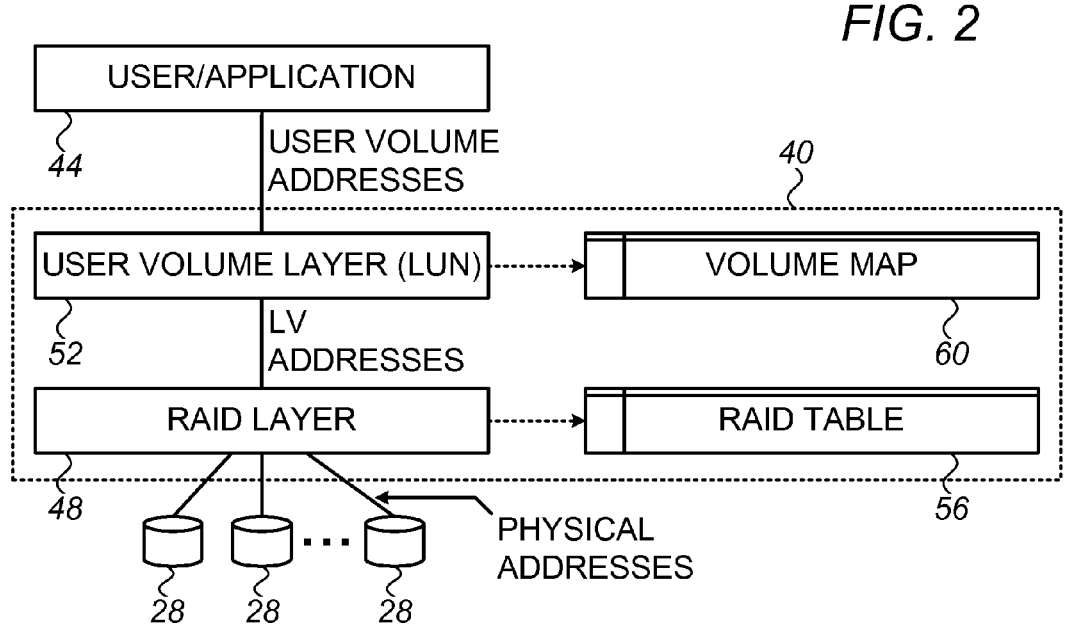
FIG. 2 is a block diagram that schematically illustrates elements of a storage agent, in accordance with an embodiment of the present invention.

FIG. 2 is a block diagram that schematically illustrates elements of storage agent 40, in accordance with an embodiment of the present invention. A respective storage agent of this sort typically runs on each server 24 and performs storage-related functions for user applications 44 running on the server. As noted above, servers 24 may comprise physical and/or virtual servers. Thus, a certain physical computer may run multiple virtual servers 24, each having its own respective storage agent 40.

In the disclosed embodiments, each storage agent 40 comprises a Redundant Array of Independent Disks (RAID) layer 48 and a user-volume layer 52. RAID layer 48 carries out a redundant storage scheme over storage devices 28, including handling storage resiliency, detection of storage device failures, rebuilding of failed storage devices and rebalancing of data in case of maintenance or other evacuation of a storage device. RAID layer 48 also typically stripes data across multiple storage devices 28 for improving storage performance.

In the present example, RAID layer 48 implements a RAID-10 scheme, i.e., replicates and stores two copies of each data item on two different storage devices 28. One of the two copies is defined as primary and the other as secondary. The primary copy is used for readout as long as it is available. If the primary copy is unavailable, for example due to storage-device failure, the RAID layer reverts to read the secondary copy. Alternatively, however, RAID layer 48 may implement any other suitable redundant storage scheme.

RAID layer 48 accesses storage devices 28 using physical addressing. In other words, RAID layer 48 exchanges with storage devices 28 read and write commands, as well as responses and retrieved data, which directly specify physical addresses (physical storage locations) on the storage devices. In this embodiment, all physical-to-logical address translations are performed in agents 40 in the servers, and none in the storage devices.

The RAID layer maps between physical addresses and Logical Volumes (LVs) to be used by user-volume layer 52. Each LV is mapped to two or more physical-address ranges on two or more different storage devices. The two or more ranges are used for storing the replicated copies of the LV data as part of the redundant storage scheme.

The redundant storage scheme (e.g., RAID) is thus hidden from user-volume layer 52. Layer 52 views the storage medium as a set of guaranteed-storage LVs. User-volume layer 52 is typically unaware of storage device failure, recovery, maintenance and rebuilding, which are handled transparently by RAID layer 48. (Nevertheless, some optimizations may benefit from such awareness by layer 52. For example, there is no need to rebuild unallocated storage space.)

User-volume layer 52 provides storage resources to applications 44 by exposing user volumes that are identified by respective Logical Unit Numbers (LUNs). The terms "user volume" and "LUN" are used interchangeably herein. In other words, a user application 44 views the storage system as a collection of user volumes, and issues storage commands having user-volume addresses.

Storage agent 40 translates between the different address spaces using a RAID table 56 and a volume map 60. RAID table 56 holds the translation between LV addresses and physical addresses, and volume map 60 holds the translation between user-volume addresses and LV addresses.

Typically, any server 24 may attach to any user volume. A given user volume may have multiple servers attached thereto. In some embodiments, storage controllers 36 define and maintain a global volume map that specifies all user volumes in system 20. Volume map in each storage agent 40 comprises a locally-cached copy of at least part of the global volume map. In agent 40 of a given server, volume map 60 holds at least the mapping of the user volumes (LUNs) to which this server is attached. In an embodiment, volume map 60 supports thin provisioning.

Basic Storage I/O Path

As noted above, system 20 is designed such that data-path storage commands are exchanged directly between servers 24 and storage devices 28, and do not involve or pass via storage controllers 36. In the present context, the terms "directly" and "not via the storage controllers" address the logical information flow, and not necessarily a geographical or physical flow. For example, in one embodiment the storage devices are implemented in a certain storage rack, and the storage controllers are implemented as software modules that run on CPUs in the same rack. Since the data-path storage commands do not trigger or otherwise involve the CPUs, this configuration also qualifies as a direct exchange of commands not via the storage controllers.

In some embodiments, all storage devices 28 have the same formatting and the same guarantees for atomicity, e.g., using 512-byte sectors. The various storage functions preserve the atomicity guarantees of storage devices 28. Thus, the user volumes exposed to applications 44 typically have the same formatting as the storage devices, e.g., 512-byte sectors, aligned to the 512-byte sectors of the storage devices.

The embodiments described herein assume that each storage device 28 provides multiple server-specific queues for storage commands, and has the freedom to queue, schedule and reorder execution of storage commands. In some embodiments, agent 40 in each server 24 maintains a respective queue per storage device, corresponding to the respective server-specific queues of the storage devices. Agents 40 and storage devices 28 are permitted to reorder storage commands in the queues. The queues in a given agent 40 have no visibility outside the context of the respective server.

In the disclosed embodiments, it is possible that two or more servers attempt to access a given sector in a storage device concurrently. In such a case, no guarantee is given as to which access will be completed first. The servers are expected to coordinate this competition for resources.

Raid Layer Considerations

In the disclosed embodiments, agents 40 in servers 24 carry out the various redundant storage (e.g., RAID) functions in a fully distributed manner, without involving storage controllers 36. Since the RAID layer is distributed among the servers, each server 24 accessing a certain physical storage device 28 holds all the information needed for its RAID functionality in RAID table 56.

In some embodiments, storage devices 28 are grouped together in a RAID group. In the present RAID-10 example, N storage devices are grouped together and expose a capacity that is 50% of the actual total storage capacity of the storage devices. In an example embodiment, RAID table 56 in each agent 40 comprises a constant-length extent table that maps logical address ranges to physical address ranges.

In an example implementation, the logical address space of the system is divided into 1 GB ranges. Each 1 GB range of logical addresses has two entries in RAID table 56, pointing to two 1 GB physical address-space ranges on two different storage devices 28. The RAID table is typically predefined, and changes only rarely, e.g., upon removal or addition of physical storage devices. The RAID table of a given RAID group is typically written by storage controllers 36 and distributed to agents 40 in the various servers 24 that access this RAID group.

Upon serving a write request, RAID layer 48 typically looks-up the logical address specified in the request, and translates the logical address to two physical addresses on the storage devices, by querying RAID table 56. The RAID layer then issues two write requests in parallel to the two storage devices.

The RAID functionality described above is depicted purely by way of example, in order to demonstrate the concept of direct and fully-distributed RAID operation. Alternatively, any other suitable redundant storage scheme can be used.

Example Storage Method Descriptions

The description that follows presents examples of storage mechanisms that are implemented on top of the above-described system configuration. These examples include write-command processing, user-volume reservation, and memory space allocation and recovery from storage-device failure. The embodiments described below refer to various actions taken by servers 24. These actions are typically carried out by agents 40 in the respective servers.

It should be noted that the storage mechanisms described below are chosen purely for the sake of conceptual clarity. In alternative embodiments, any other suitable storage task can be implemented using above-described system configuration, in any other suitable way.

SCSI Reservations

Figure 3:
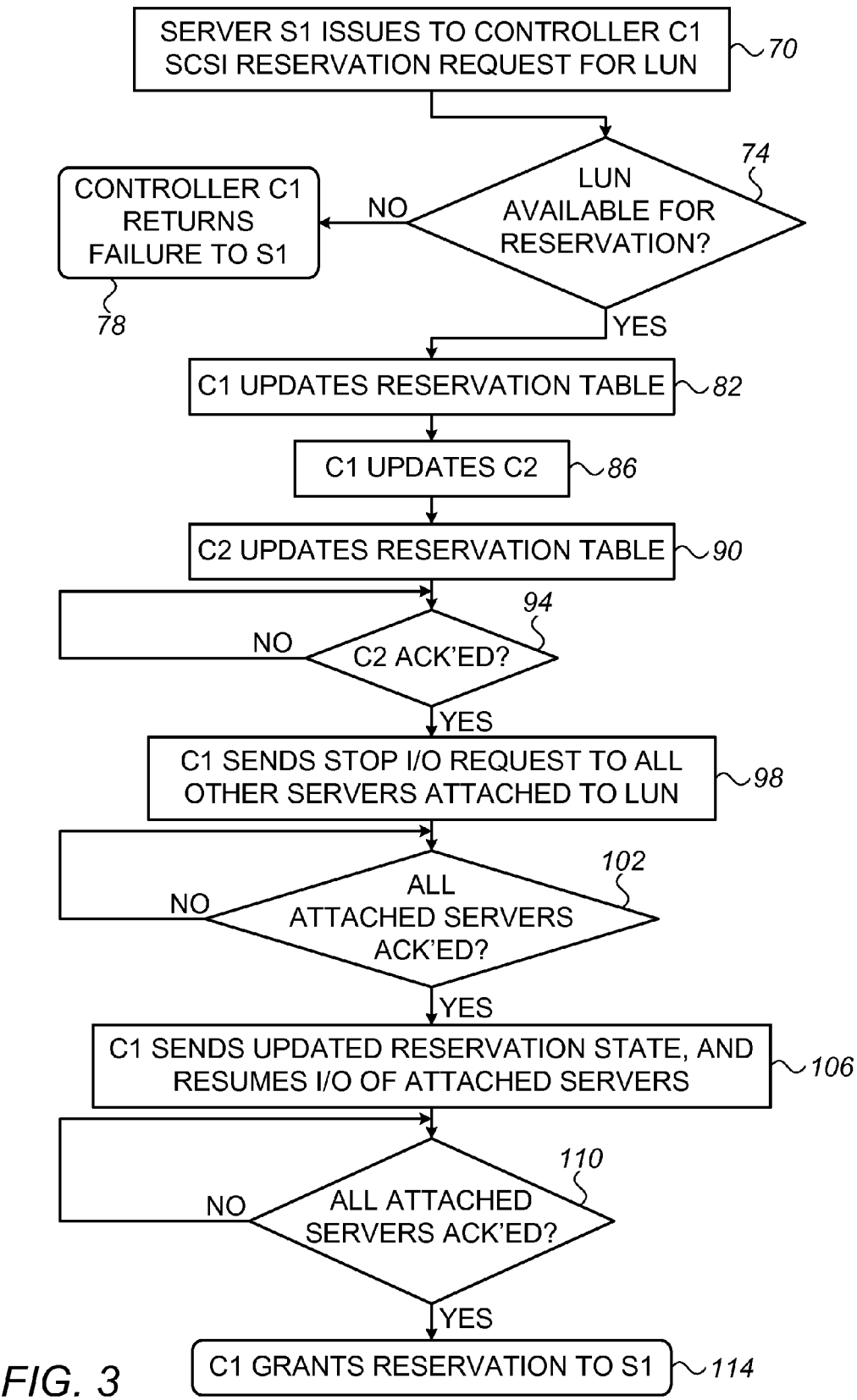
FIG. 3 is a flow chart that schematically illustrates a method for obtaining a Small Computer System Interface (SCSI) reservation, in accordance with an embodiment of the present invention.

FIG. 3 is a flow chart that schematically illustrates a method for obtaining a SCSI reservation, in accordance with an embodiment of the present invention. The SCSI protocol defines a reservation mechanism for managing a lock on a user volume (LUN) or part thereof. The method of FIG. 3 can be used by servers 24 of system 20 to obtain a SCSI reservation on a given LUN.

In this embodiment, a server 24 that prepares to access a given LUN sends a SCSI reservation request to one of storage controllers 36. The storage controllers update each other with the reservations, and a storage controller confirms a reservation to a server only after committing the request with its peer controller. If one of the storage controllers fails, the exact state known to all servers regarding SCSI reservations is retained in the other storage controller.

The storage controllers typically maintain an attached-servers list that indicates, per LUN, which servers are attached to the LUN (i.e., allowed to send storage commands to the LUN). The storage controllers notify the attached servers of reservation changes. The storage controllers typically update the attached servers synchronously before committing the reservation (or release of a reservation) to the requesting server. Each attached server typically maintains the SCSI reservation state for the LUN in question locally, so that access requests to the LUN do not need to involve the storage controllers.

According to the SCSI specification, a reservation may apply to some or all of the commands in the task set before completion of the reservation command. The reservation then applies to all commands received after successful completion of the reservation command. To facilitate this feature, global synchronization is performed for all servers attached to the LUN.

The method of FIG. 3 begins with server S1 issuing a SCSI reservation on a LUN to storage controller C1, at a reservation requesting step 70. C1 is assumed to be the primary storage controller. Note that the reservation specifies a LUN, and is not related to any particular physical storage device or LV.

Controller C1 maintains a reservation table that indicates which LUNs are currently reserved. Controller C1 checks in its reservation table whether the LUN in question is available for reservation, at an availability checking step 74. If not, e.g., because the LUN is currently reserved for another server, controller C1 returns a failure notification (e.g., ERROR_RESERVATION_CONFLICT) to server S1, at an error termination step 78.

If the requested LUN is available for reservation, controller C1 updates its reservation table to indicate that the LUN is reserved to server S1, at a primary reservation updating step 82. Controller C1 updates C2 (the secondary storage controller) of the reservation, at a secondary updating step 86. Controller C2 updates its reservation table accordingly, taking care of possible races with other reservations, at a secondary reservation updating step 90. Controller C1 waits until controller C2 acknowledges its update of the reservation table, at a secondary acknowledgement step 94.

Only then, controller C1 sends "stop I/O" requests to all the servers (other than S1) that are attached to the LUN, at a stop I/O requesting step 98. The stop I/O requests instruct the attached servers to stop accessing the LUN, and are typically time-out protected. Servers that are not attached to the LUN are not involved in this process.

At a server acknowledgement step 102, controller C1 waits until all the attached servers acknowledge that they have stopped accessing the LUN. Once all the attached servers have acknowledged, controller C1 sends to the attached servers an updated reservation state, and an "I/O resume" request, at a resumption step 106. In response, the attached servers update their local reservation states, resume I/O to the LUN, and send acknowledgments to controller C1.

Controller C1 waits until all the attached servers have acknowledged, at a resumption acknowledgement step 110. Only then, controller C1 sends to server S1 a response to the reservation request, i.e., grants S1 the reservation on the requested LUN, at a granting step 114.

In order to handle failure scenarios, the "stop I/O" command remains in effect for only a predefined time period, and all operations are rolled-back if an acknowledgment is not received on time.

The two-stage global synchronization method of FIG. 3 is not limited to SCSI reservations. In alternative embodiments, such a process can be used in various other storage processes that require synchronization, such as in creating application-consistent snapshots or in user-volume trimming and unmapping operations. This issue is also addressed in the description of FIGS. 5A and 5B below.

Global Volume Map, and Write Request Processing

As noted above, storage controllers 36 maintain a global volume map that defines the translation between user-volume addresses and LV addresses. The storage controllers synchronize and update each other with changes in the global volume map, so that an up-to-date and consistent volume map will be available in case of storage controller failure.

Volume map 60 in each server 24 comprises a cached local copy of at least a portion of the global volume map that is relevant to the server. In a given server 24, agent 40 may cache the entire global volume map locally, for example if it accesses a certain LUN frequently. An agent 40 may alternatively cache only portions of the global volume map, for example if it frequently accesses specific sub-ranges of a specific volume. Further alternatively, an agent 40 may choose not to cache the volume map at all, and query the storage controllers for the relevant volume with each storage command. The storage controllers typically notify all the attached servers of changes in the maps of volumes to which they are attached.

Storage controllers 36 and servers 24 may represent the volume map using any suitable data structure. In one embodiment, the volume map comprises a table of fixed address range sizes (e.g., every N bytes of user address space are mapped to N bytes of LV address space). Alternatively, the volume map may comprise a binary search tree that can map variable range sizes. Further alternatively, the disclosed techniques can be carried out using a volume maps that uses any other suitable format or representation scheme.

Figure 4B:
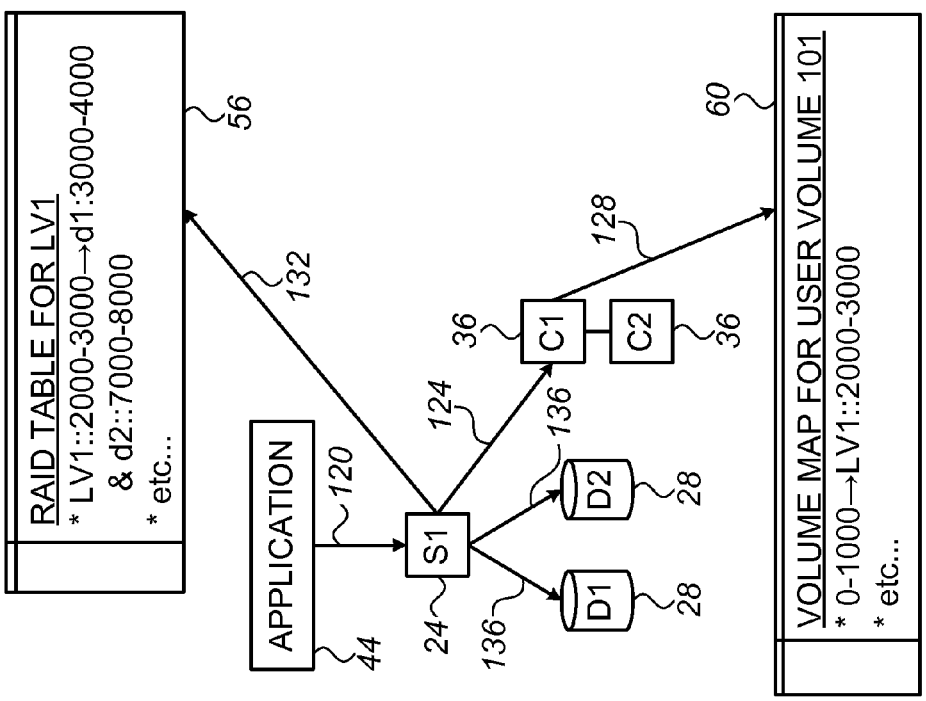
FIGS. 4A and 4B are diagrams that schematically illustrate a method for performing a write command, in accordance with an embodiment of the present invention.
Figure 4A:
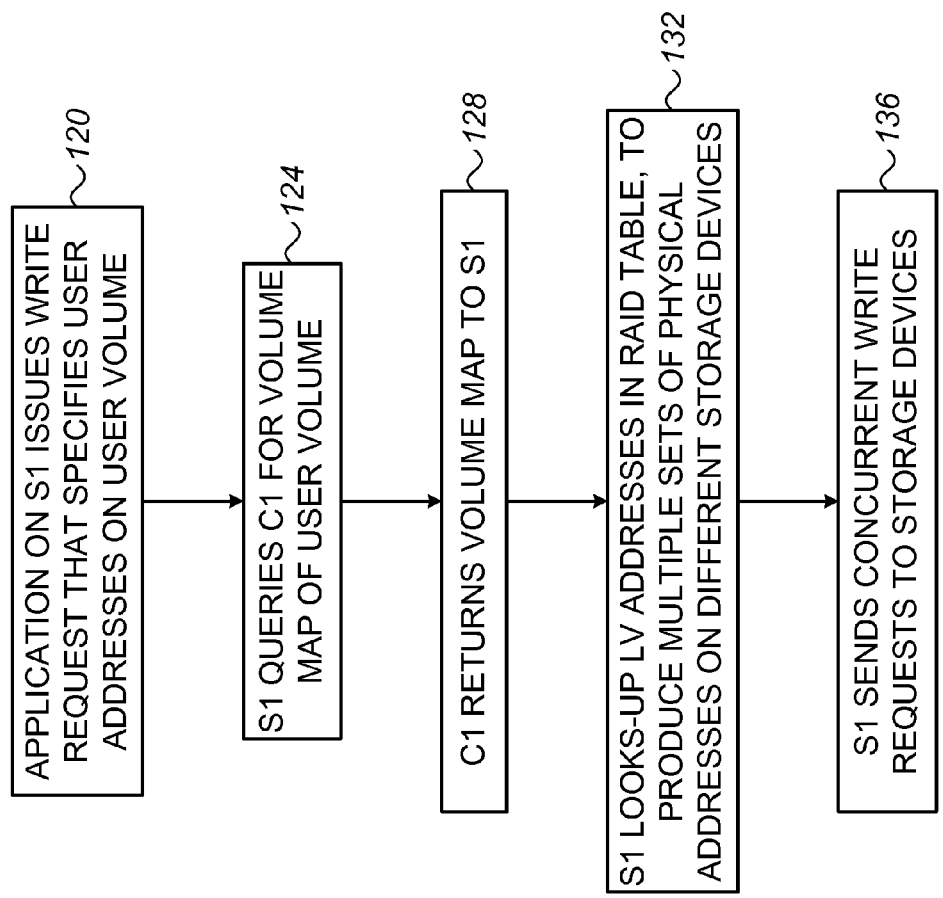

FIGS. 4A and 4B are diagrams that schematically illustrate a method for performing a write command, in accordance with an embodiment of the present invention. FIG. 4A is a flow chart of the method. FIG. 4B shows the message flow between elements of system 20 using the same reference numbers, for ease of reference. Reference is made to the two figures in parallel.

The method begins with an application on server S1 issuing a write request to a user volume (LUN) 101, at a write requesting step 120. In this example, the write request specifies the range of user-volume addresses 0-1000.

At a volume map querying step, server S1 requests storage controller C1 for the volume map of the LUN in question. Controller C1 returns the volume map of the LUN, or a portion thereof, to server S1, at a volume map returning step 128. (If server S1 holds a valid locally-cached copy of the relevant portion of the volume map, steps 124 and 128 can be omitted.) In the present example, the volume map specifies that user-volume addresses 0-1000 are mapped to LV addresses 2000-3000 in logical volume LV1.

Server S1 looks-up these LV addresses in RAID table 56, at a RAID lookup step 132. In accordance with the RAID table, LV addresses 2000-3000 in LV1 are mapped to physical addresses 3000-4000 on storage device D1, and 7000-8000 on storage device D2. Thus, at a write command step 136, server S1 issues two write requests in parallel to storage devices D1 and D2.

Thin Provisioning, and Free-Space Allocation and Release

In some embodiments, the global volume map in system 20 is sparse, so as to support thin provisioning. i.e., not all user-volume addresses must be allocated to LV addresses at all times. A user-volume address is only mapped when it is first written. Readout from an unmapped user-volume address will typically return zero, in response to a query to the volume map that indicated that this address is not mapped.

In an embodiment, a write request to an unmapped user-volume address triggers a free-space allocation process, i.e., the volume map will be updated with a new user-address-to-LV-address mapping of a certain address range, and free memory space will be allocated for this purpose. The free space on the physical devices is managed by storage controllers 36. As soon as the volume map is updated, the write request can be fulfilled as the physical address range that is the target of this write request is now allocated and known.

Typically, free space allocation requests to the storage controllers are protected from concurrency issues by the storage controllers, so that a chunk of free space cannot be allocated twice, nor can a single user-volume address be allocated twice by two concurrently-writing servers.

Various free-space allocation strategies can be used. A trade-off typically exists between memory efficiency and the performance impact of having to access or modify the volume map too frequently. The space allocation strategy can be reflected in the minimal allocation size, which can range, for example, from 512 bytes (ideal space efficiency), through 4 KB (good fit for NVRAM), through 64 KB (good fit for SSD), and up to 1 MB (good fit for HDD). Nevertheless, a strategy of thick provisioning, i.e., allocating the entire user volume in advance regardless of actual access, is also feasible.

Figure 5B:
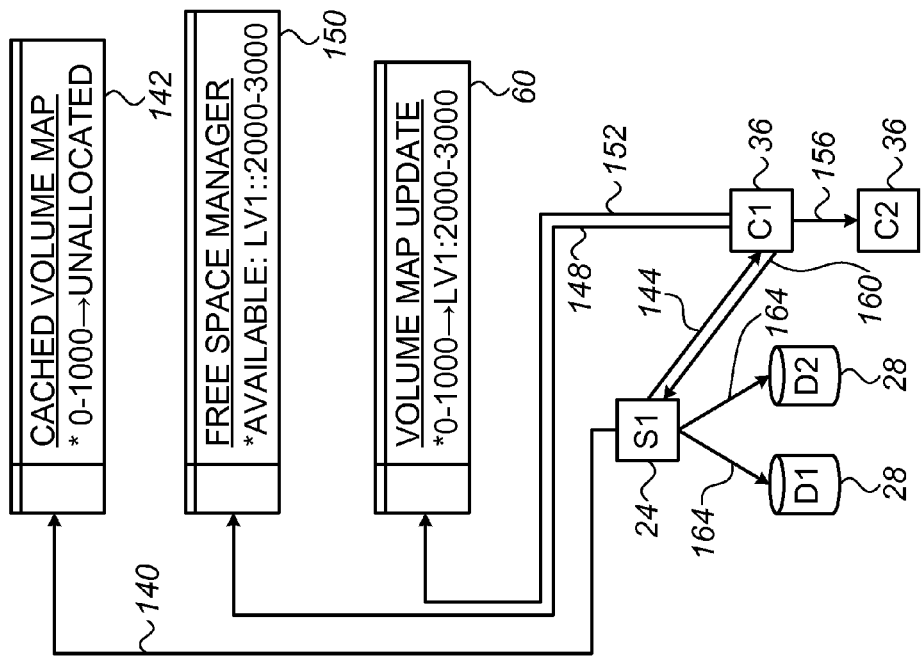
FIGS. 5A and 5B are diagrams that schematically illustrate a method for memory space allocation, in accordance with an embodiment of the present invention.
Figure 5A:
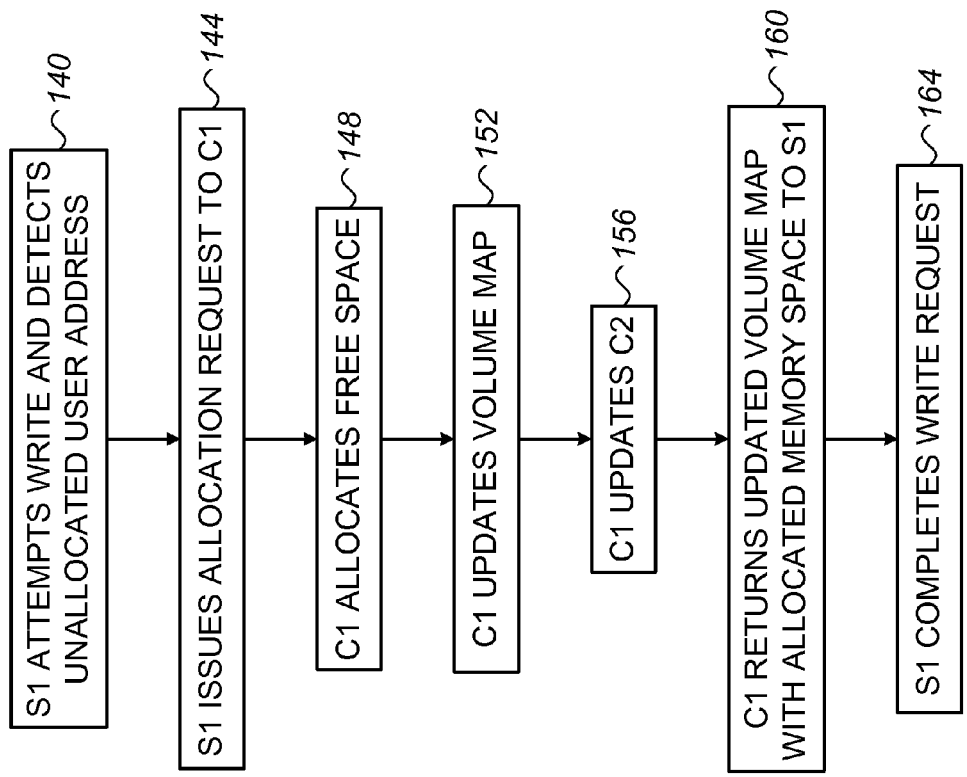

FIGS. 5A and 5B are diagrams that schematically illustrate a method for memory space allocation, in accordance with an embodiment of the present invention. Again, FIG. 5A is a flow chart of the method, and FIG. 5B shows the message flow between elements of system 20 using the same reference numbers.

The method begins with server S1 attempting to write to a certain user-volume address, at a write attempting step 140. In the present example, S1 attempts to write to user-volume addresses 0-1000. In accordance with a locally-cached copy 142 of the volume map, this address range is unallocated (unmapped).

In response, server S1 issues an allocation request to storage controller C1, at an allocation requesting step 144. At an allocation step 148, controller C1 allocates an available range of LV addresses, in the present example addresses 2000-3000 in LV1. For this purpose, the storage controllers typically maintain a data structure 150 that indicates the pool of available LV addresses.

Controller C1 updates the global volume map with the new allocation, at a map updating step 152. Controller C1 also updates controller C2 with the new allocation, at a controller updating step 156. Controller C1 mitigates possible races with other allocations or other modifications to the volume map.

Controller C1 returns the updated volume map including the new allocation, or a relevant portion thereof, to server S1, at a map returning step 160. At a completion step 164, server S1 completes the write request initiated at step 140 above.

In some embodiments, the thin provisioning scheme in system 20 allows for memory space to be freed when possible. For example, when an entire user volume is deleted, the storage controllers may return all the allocated LV addresses of this user volume to the free space pool. As another example, servers 24 can issue the UNMAP or TRIM SCSI commands, which free a user-volume address range within an existing user volume.

To implement the UNMAP or TRIM feature in system 20, however, the storage controllers ensure that all servers attached to the user volume are informed of the UNMAP/TRIM command synchronously, to avoid a situation in which one server frees a range of addresses while another server writes to it. In some embodiments, UNMAP/TRIM is performed under SCSI reservation for the user volume, or at least for the specific user-volume addresses being trimmed or unmapped. In some embodiments, system 20 uses the synchronization method of FIG. 3 above for this purpose.

In contrast, new allocations do not necessarily need to be updated synchronously to all attached servers, since the servers will discover the updates implicitly when attempting to write to the newly-allocated regions. In such a scenario, a server is initially unaware that certain LV space has already been allocated. The server assumes that a space allocation request is needed. The storage controllers will return a failure result with an "already allocated" status. At this point the server will update the relevant portion of the volume map to reflect the new allocation. Similarly, if a read request returns an "unmapped" result, the requesting server will typically update its locally-cached volume map from the storage controller to ensure that the LV address region has not been recently allocated.

For a stable user volume, the volume map is typically constant. Thus, a server that chooses to cache the entire global volume map (or relevant portions thereof) will have little or no need to communicate with the storage controllers for logical-to-physical address translations. In most practical scenarios, after a certain short period of immaturity after a volume is created, most user volumes enter a long period of maturity with little or no new allocations or space release operations.

Storage Device Failure

Typically, failure of a storage device 28 can be detected by any server 24, during access (e.g., read or write request) to the failed storage device. A server detecting such an error reports the situation to storage controllers 36 in order to invoke storage device replacement (which requires technician intervention).

In an embodiment, when a read request to a storage device fails, the server will issue a device failure warning to the storage controller, and attempt to read the data from the secondary copy. When a write request to one of the copies fails, the server will issue a device failure warning to the storage controller. Since two copies of the data exist, and one of them has failed, the system is no longer redundant but the storage is still accessible. All servers performing concurrent writes or reads will follow the same procedure, thereby preserving data consistency.

This single fault situation is sustained until the failed storage device is replaced. The newly-introduced storage device cannot be used for readout, since it does not yet hold the secondary copy of the data, but can be used for new storage. In an embodiment, the storage controllers initiate a process that rebuilds the new storage device. In an example rebuild process, the storage controllers crawl the relevant RAID tables.

When detecting a RAID-table entry that contains a primary or secondary copy of data that should reside on the new storage device, the healthy copy is copied to the new device. The volume map is typically not modified by the rebuild process, since it does not involve new memory allocation or release. When the rebuild process is completed, and only then, the new storage device is ready for use for reading. Write requests, as explained above, can be served by the new device as soon as it is introduced into the system, regardless of the status of the rebuild process.

The rebuild process can typically be completed in a single crawl of the RAID tables of the RAID group in question. LV memory blocks that are newly allocated or newly freed during the rebuild process (and in turn modify the volume map) will typically have their new data updated on the new storage device at the time of block allocation or block freeing, and therefore have no impact on the rebuild process.

FIGS. 6A and 6B are diagrams that schematically illustrate a method for data rebuilding following storage device failure, in accordance with an embodiment of the present invention. FIG. 6A is a flow chart of the method, and FIG. 6B shows the message flow between elements of system 20 using the same reference numbers.

The method begins with server S1 detecting that storage device D1 has failed, at a failure detection step 170. Server S1 reports the failure to storage controller C1, and controller C1 updates controller C2, at a failure updating step 174. Device D1 is marked as failed and taken out of service.

At some point, the failed device D1 is replaced with a new storage device denoted D1'. At a replacement updating step 178, storage controller C1 is notified of the replacement, and updates controller C2. Storage controller C1 also notifies all servers that storage device D1' is available for writing (but not yet for reading).

Now storage controller C1 initiates a rebuild process of D1'. At a crawling step 182, controller C1 crawls all RAID tables 56 that refer to data stored on D1 (the failed device). At a rebuilding step 186, for each RAID-table entry, controller C1 checks whether the primary or secondary copy of the data resides on D1. For each RAID-table entry that has a copy on D1, controller C1 performs the following:

Read a valid copy of data from another storage device (D2 in this example).

Write the valid data to storage device D1', to the physical address specified by the RAID table. Note that this is not a new allocation, but a rebuild of missing data in an existing allocation.

Re-read the copy of the data from D2, and check if it has changed since the initial readout from D2.

A change in the copy on D2 indicates that a parallel server write request has been performed, and therefore storage controller C1 re-writes the data again to D1' to ensure that the newest data is written.

At a rebuild updating step 190, once the rebuild process is completed, controller C1 updates all servers that storage device D1' is available for reading, as well.

Handling of Server and Storage Controller Failures

As explained above, each server 24 in system 20 initiates I/O commands only for itself, and is not aware of or affected by I/O commands of other servers. Therefore, if a server fails, all I/O commands in progress are typically also lost. This loss, however, has no impact on the system because the lost I/O commands pertain only to the failed server.

Since servers 24 do not hold any state of the system, servers can fail and re-appear without causing any data inconsistency. Servers typically receive all relevant state information from the storage controllers when logging in and mapping volumes. In procedures that involve communication between the server and the storage controllers (e.g., reservations), measures such time-outs and blacklisting are typically used to ensure correct operation.

Storage controllers 36 are dual-redundant and highly-available. As demonstrated in the method descriptions above, each control modification request issued to either storage controller is replicated by the serving storage controller to its peer, so that upon failure of either storage controller the entire state is retained. Each control read request can be issued to either storage controller, and will receive the same result regardless of which storage controller is being queried. The involvement of the storage controllers is typically confined to control-plane operations. As such, their workload can be easily sustained by a dual-redundancy scheme (in lieu of a cluster of storage controllers).

Power Outage Handling

In some embodiments, power outage in a server is treated similarly to a server failure as described above. Power outage in a single storage controller is typically treated as a storage controller failure as described above, i.e., using backup from the peer storage controller. Power outage in both storage controllers is critical, since it may lead to loss of critical data structures such as the volume map and free-space map. Therefore, the storage controllers typically have power-outage resilient power supply, e.g., an external Uninterruptible Power Supply (UPS) or Backup Batter Unit (BBU), or some form of NVRAM or battery-backed memory modules.

Power outage in a storage device 28 may be treated differently from the device failures addressed above, since it may be assumed that all (or at least several) storage devices suffer power outage together. Several solutions are possible. For example, caching of I/O in the storage devices can be inhibited. Alternatively, the internal RAM write cache memory of the storage devices may be fitted with power outage protection, such as a super-capacitor or battery.

Handling of Multiple Storage Devices

In order to handle multiple storage devices 28, the volume map entries typically indicate the LV address, as well as the LV-internal address of each data entry. Thus, a volume map can contain blocks that reside on many LVs. The actual physical storage devices are handled and aggregated by the RAID layer. In RAID-10, for example, the primary and secondary copies of the data of each block reside on two different storage devices. This constraint is resolved during the creation of the RAID table.

Storage devices 28 can be aggregated into failure domains, which essentially translates into a constraint in the creation of the RAID table, to ensure that redundant copies of data of any allocation request will not both reside in the same failure domain. When designing the RAID table in this manner, all storage devices that are part of a single failure domain (e.g., storage devices tied to the same power supply unit or data bus) can fail together without causing data loss.

Storage devices can be added freely to the system, and merely reflect more free space available in the free space pool for future allocations.

Summary of Storage Controller Functions

In some embodiments, storage controller 36 is responsible for the following processes and data structures:
Knowledge of which storage devices 28 exist in the system, their capacities and addresses.
Knowledge of which servers 24 exist in the system, i.e., servers that are allowed to access the storage system.
Management of the RAID table, e.g., dividing the storage devices into RAID groups, creating the RAID table, defining LVs on top of the RAID group, distributing the RAID table to the servers and notifying the servers of changes in the RAID table (e.g., due to storage device addition or removal).
Management of the list of user volumes, where each user volume has its own volume map.
Management of the list of attached servers, where each user volume has a list of attached servers and each server has a list of user volumes it is attached to.
Managing SCSI reservations, serving SCSI reservation requests and releases from the servers, notifying servers of SCSI reservation changes.
Management of the free space available on each storage device and on each LV.
Managing block allocation and release requests from the servers—such requests are typically updated in the volume map.
Management of the volume maps, serving volume maps to servers, notifying servers of volume map changes (e.g., upon new allocation or freed space).
Being informed by servers about storage device faults. Notifying servers of storage device replacements (e.g., when new device is not available for reading, but can be written to).
Performing storage device rebuild processes, notifying servers of rebuild completion (when new storage device is available for reading).
Storage controller High Availability (HA), e.g., knowledge about the peer storage controller, updating of peer on all state changes, ability to reconstruct peer in case of failure with exact state.

Summary of Server Functions

In some embodiments, servers 24 are responsible for the following processes and data structures. As noted above, these functions are typically carried out by storage agents 40 in the servers.
Initial connection with storage controllers.
Receive storage devices network addresses from the storage controller, make initial connection with storage devices through the network (each server is securely assigned a unique queue within the storage device by the storage controller).
Receive the RAID table from the storage controller.
Receive a list of available user volumes from the storage controller.
When an application requests, attach to specific user volume (a request towards the storage controller) and present to the application a block device representing the attached user volume.
Receive the volume map from the storage controller, receive updates to the volume map, locally-cache the volume map or portions thereof.
Receive the SCSI reservation state for the volume, receive updates to the state from the storage controllers, and enforce the SCSI reservation state in the I/O path.
Send SCSI reservation requests as the application requests them.
Send space allocation requests when an application write hits an address not mapped in the volume map.
Send UNMAP/TRIM requests as the application requests them.

Full ownership of read/write I/O requests (from servers directly to storage devices), including (for RAID-10) writing to two separate copies as indicated in the RAID table.

Detecting device failures and informing the storage controller.

Getting device replacement updates from the storage controller, being aware that initially replaced storage devices can only be written to and later, as the storage controller indicates that the rebuild process has completed, can also be read from.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
   in a system that comprises one or more storage controllers, multiple servers and multiple multi-queue storage devices, assigning in each storage device server-specific queues for queuing data-path storage commands exchanged with the respective servers; and
   exchanging at least some of the data-path storage commands directly between the servers and the storage devices, not via the storage controllers, to be queued and executed in accordance with the corresponding server-specific queues,
   wherein exchanging the data-path storage commands comprises accessing the storage devices by:
      locally-caching in a given server, or looking-up in the storage controllers by the given server, at least a portion of a volume map that specifies user volumes for use by the servers; and
      accessing the storage devices by the given server, by querying the locally-cached or looked-up volume map.

2. The method according to claim 1, wherein exchanging the data-path storage commands comprises queuing the data-path storage commands in the given server in one or more storage-device-specific queues, which respectively correspond to one or more of the storage devices accessed by the given server.

3. The method according to claim 1, wherein exchanging the data-path storage commands comprises running in the given server a respective storage agent that communicates directly with the server-specific queues assigned to the given server in the storage devices.

4. The method according to claim 1, wherein exchanging the data-path storage commands comprises translating in the given server between virtual and physical storage addresses, and specifying the data-path storage commands in the given server using the physical storage addresses.

5. The method according to claim 4, wherein translating between the virtual and the physical storage addresses comprises locally storing in the given server a mapping that maps each virtual address range to multiple redundant ranges of the physical storage addresses located on two or more of the storage devices, and translating between the virtual and the physical storage addresses by querying the mapping.

6. The method according to claim 1, and comprising granting to the given server a reservation on at least a portion of a user volume only in response to ensuring that all other servers that are attached to the user volume have temporarily stopped accessing the user volume and have been provided with an up-to-date state of the reservation.

7. The method according to claim 1, and comprising, in response to an access by the given server to a logical address that is not yet allocated a respective physical address, allocating the respective physical address by the storage controllers.

8. The method according to claim 1, and comprising, in response to replacement of a failed storage device, rebuilding on a new storage device data that was stored on the failed storage device, by copying redundant copies of the data from one or more other storage devices to the new storage device.

9. A computing system, comprising:
   one or more storage controllers, which are configured to assign in each of multiple multi-queue storage devices server-specific queues for queuing data-path storage commands exchanged with multiple servers; and
   multiple processors, which are comprised in the respective servers and are configured to exchange at least some of the data-path commands directly between the servers and the storage devices, not via the storage controllers, to be queued and executed in accordance with the corresponding server-specific queues,
   wherein a given processor in a given server is configured to locally-cache, or look-up in the storage controllers, at least a portion of a volume map that specifies user volumes for use by the servers, and to access the storage devices by querying the locally-cached or looked-up volume map.

10. The system according to claim 9, wherein the given processor is configured to queue the data-path storage commands in one or more storage-device-specific queues, which respectively correspond to one or more of the storage devices accessed by the given server.

11. The system according to claim 9, wherein the given processor is configured to translate between virtual and physical storage addresses, and to specify the data-path storage commands exchanged with the storage devices using the physical storage addresses.

12. The system according to claim 11, wherein the given processor is configured to locally-store in the given server a mapping that maps each virtual address range to multiple redundant ranges of the physical storage addresses located on two or more of the storage devices, and to translate between the virtual and the physical storage addresses by querying the mapping.

13. The system according to claim 9, wherein the storage controllers are configured to grant to the given server a reservation on at least a portion of a user volume only in response to ensuring that all other servers that are attached to the user volume have temporarily stopped accessing the user volume and have been provided with an up-to-date state of the reservation.

14. The system according to claim 9, wherein, in response to an access by the given server to a logical address that is not yet allocated a respective physical address, the storage controllers are configured to allocate the respective physical address.

15. The system according to claim 9, wherein, in response to replacement of a failed storage device, the storage controllers are configured to rebuild on a new storage device data that was stored on the failed storage device, by copying redundant copies of the data from one or more other storage devices to the new storage device.

\* \* \* \* \*